US009280907B2

(12) United States Patent
Dorman

(10) Patent No.: US 9,280,907 B2
(45) Date of Patent: Mar. 8, 2016

(54) PROCTORED PERFORMANCE ANALYSIS

(75) Inventor: William Dorman, Phoenix, AZ (US)

(73) Assignee: Kryterion, Inc., Pheonix, AZ (US)

( * ) Notice: Subject to any disclaimer, the term of this patent is extended or adjusted under 35 U.S.C. 154(b) by 844 days.

(21) Appl. No.: 12/913,697

(22) Filed: Oct. 27, 2010

(65) Prior Publication Data
US 2011/0207108 A1    Aug. 25, 2011

Related U.S. Application Data

(63) Continuation-in-part of application No. 12/571,666, filed on Oct. 1, 2009.

(51) Int. Cl.
| G09B 3/00 | (2006.01) |
|---|---|
| G09B 7/00 | (2006.01) |
| G09B 7/02 | (2006.01) |
| G09B 5/00 | (2006.01) |
| G09B 7/07 | (2006.01) |
| G09B 9/00 | (2006.01) |

(52) U.S. Cl.
CPC .. *G09B 7/00* (2013.01); *G09B 5/00* (2013.01); *G09B 7/02* (2013.01); *G09B 7/07* (2013.01); *G09B 9/00* (2013.01)

(58) Field of Classification Search
USPC ............................ 434/323, 350, 362; 709/220
See application file for complete search history.

(56) References Cited

U.S. PATENT DOCUMENTS

| 4,458,315 A | 7/1984 | Uchenick |
|---|---|---|
| 4,951,249 A | 8/1990 | McClung et al. |
| 5,204,813 A | 4/1993 | Samph et al. |
| 5,211,564 A | 5/1993 | Martinez et al. |
| 5,361,359 A | 11/1994 | Tajalli et al. |
| 5,412,717 A | 5/1995 | Fischer |
| 5,635,940 A | 6/1997 | Hickman et al. |

(Continued)

FOREIGN PATENT DOCUMENTS

| CN | 1949186 | 4/2007 |
|---|---|---|
| CN | 102696019 A | 9/2012 |

(Continued)

OTHER PUBLICATIONS

U.S. Appl. No. 12/571,666, Office Action mailed Jan. 29, 2014.
U.S. Appl. No. 12/723,663, Office Action mailed Dec. 18, 2013.
U.S. Appl. No. 12/723,663, Final Office Action mailed Oct. 8, 2013.
U.S. Appl. No. 12/723,663, Office Action mailed Jul. 17, 2013.
U.S. Appl. No. 12/723,663, Final Office Action mailed Apr. 5, 2013.
U.S. Appl. No. 12/723,666, Final Office Action mailed Dec. 18, 2013.
U.S. Appl. No. 12/723,666, Office Action mailed Jun. 19, 2013.
U.S. Appl. No. 12/723,666, Final Office Action mailed Apr. 5, 2013.

(Continued)

*Primary Examiner* — Michael Grant
(74) *Attorney, Agent, or Firm* — Lewis Roca Rothgerber Christie LLP

(57) ABSTRACT

Systems and methods described herein provide for administering and proctoring of a secure online exam that allows for complex testing utilizing practical examination tasks. The practical examination tasks provide for evaluation of the knowledge of the exam taker, as well as the exam taker's ability to apply that knowledge in a real-world environment. By performing the practical examination tasks in the context of a secure online exam, the competence of the test taker can be readily determined without worrying about the exam taker illicitly accessing information on their computer or via a remote source of data. The exam taker may perform the practical examination tasks through manipulation of an evaluation application executing on the exam taker's secured computer. The practical examination tasks may also be carried out through manipulation by the exam taker of an evaluation apparatus coupled to the exam taker's secured computer.

25 Claims, 5 Drawing Sheets

(56) References Cited

U.S. PATENT DOCUMENTS

| | | |
|---|---|---|
| 5,743,743 A | 4/1998 | Ho et al. |
| 5,809,230 A | 9/1998 | Pereira |
| 5,815,252 A | 9/1998 | Price-Francis |
| 5,867,646 A | 2/1999 | Benson et al. |
| 5,915,973 A | 6/1999 | Hoehn-Saric et al. |
| 5,919,257 A | 7/1999 | Trostle |
| 5,987,611 A | 11/1999 | Freund |
| 6,021,438 A | 2/2000 | Duvvoori et al. |
| 6,112,049 A | 8/2000 | Sonnenfeld |
| 6,185,619 B1 | 2/2001 | Joffe et al. |
| 6,266,773 B1 | 7/2001 | Kisor et al. |
| 6,281,894 B1 | 8/2001 | Rive |
| 6,282,404 B1 | 8/2001 | Linton |
| 6,282,573 B1 | 8/2001 | Darago et al. |
| 6,338,149 B1 | 1/2002 | Ciccone, Jr. et al. |
| 6,418,298 B1 | 7/2002 | Sonnenfield |
| 6,427,063 B1 | 7/2002 | Cook et al. |
| 6,453,398 B1 | 9/2002 | McKenzie |
| 6,523,119 B2 | 2/2003 | Pavlin et al. |
| 6,694,434 B1 | 2/2004 | McGee et al. |
| 6,766,458 B1 | 7/2004 | Harris |
| 6,948,153 B2 | 9/2005 | Bowers |
| 6,954,456 B2 | 10/2005 | Cranor et al. |
| 6,966,048 B2 | 11/2005 | Bowers |
| 7,069,586 B1 | 6/2006 | Winneg et al. |
| 7,080,303 B2 | 7/2006 | Bowers |
| 7,165,269 B2 * | 1/2007 | Winneg et al. .................. 726/16 |
| 7,194,664 B1 | 3/2007 | Fung |
| 7,293,281 B1 | 11/2007 | Moran et al. |
| 7,318,727 B2 | 1/2008 | Bowers |
| 7,494,340 B2 | 2/2009 | Bowers et al. |
| 7,725,737 B2 | 5/2010 | Konanka et al. |
| 7,886,029 B2 | 2/2011 | Rogers et al. |
| 8,713,130 B2 | 4/2014 | Logan |
| 9,092,991 B2 | 7/2015 | Logan |
| 9,137,163 B2 | 9/2015 | Perryman |
| 9,141,513 B2 | 9/2015 | Foster |
| 2002/0056010 A1 | 5/2002 | Lincoln et al. |
| 2002/0078139 A1 | 6/2002 | Dutta |
| 2002/0111173 A1 | 8/2002 | Hendrey et al. |
| 2002/0172931 A1 | 11/2002 | Greene et al. |
| 2003/0140111 A1 | 7/2003 | Pace et al. |
| 2003/0158928 A1 | 8/2003 | Knox et al. |
| 2004/0010544 A1 | 1/2004 | Slater et al. |
| 2004/0010720 A1 | 1/2004 | Singh et al. |
| 2004/0080504 A1 | 4/2004 | Salesky et al. |
| 2004/0172466 A1 | 9/2004 | Douglas et al. |
| 2004/0229199 A1 | 11/2004 | Ashley et al. |
| 2004/0230488 A1 | 11/2004 | Beenau et al. |
| 2004/0236843 A1 | 11/2004 | Wing |
| 2005/0086498 A1 | 4/2005 | Hulick |
| 2005/0240935 A1 | 10/2005 | Ramanathan |
| 2006/0080656 A1 | 4/2006 | Cain et al. |
| 2006/0085528 A1 | 4/2006 | Thomas |
| 2006/0174320 A1 | 8/2006 | Maru et al. |
| 2006/0174338 A1 | 8/2006 | Winneg et al. |
| 2007/0016777 A1 | 1/2007 | Henderson |
| 2007/0048723 A1 * | 3/2007 | Brewer et al. .................. 434/350 |
| 2007/0117082 A1 | 5/2007 | Winneg et al. |
| 2007/0117083 A1 | 5/2007 | Winneg et al. |
| 2007/0162894 A1 | 7/2007 | Noller |
| 2008/0049777 A1 | 2/2008 | Morrill et al. |
| 2008/0133964 A1 | 6/2008 | Rogers et al. |
| 2009/0035740 A1 * | 2/2009 | Reed et al. .................. 434/265 |
| 2009/0196486 A1 | 8/2009 | Distante et al. |
| 2009/0222552 A1 * | 9/2009 | Chroscielewski et al. .... 709/224 |
| 2009/0222907 A1 * | 9/2009 | Guichard .................. 726/17 |
| 2010/0055659 A1 | 3/2010 | Rogers et al. |
| 2011/0145392 A1 | 6/2011 | Dawson et al. |
| 2011/0177484 A1 | 7/2011 | Morgan et al. |
| 2011/0179491 A1 | 7/2011 | Spurlock et al. |
| 2011/0223576 A1 | 9/2011 | Foster |
| 2011/0244440 A1 | 10/2011 | Saxon |
| 2011/0279228 A1 | 11/2011 | Kumar |
| 2012/0034584 A1 | 2/2012 | Logan |
| 2012/0036215 A1 | 2/2012 | Perryman |
| 2012/0077176 A1 | 3/2012 | Foster |
| 2012/0077177 A1 | 3/2012 | Foster |
| 2012/0135388 A1 | 5/2012 | Foster |
| 2012/0162384 A1 | 6/2012 | Vesely et al. |
| 2012/0176220 A1 | 7/2012 | Garcia |
| 2012/0183181 A1 | 7/2012 | You |
| 2013/0307766 A1 | 11/2013 | Amathnadu et al. |
| 2014/0162228 A1 | 6/2014 | Logan |
| 2014/0272882 A1 | 9/2014 | Kaufmann |
| 2015/0339935 A1 | 11/2015 | Logan |

FOREIGN PATENT DOCUMENTS

| | | |
|---|---|---|
| EP | 2 483 781 | 8/2012 |
| WO | WO 2011/041707 | 4/2011 |
| WO | WO 2011/115644 | 9/2011 |
| WO | WO 2012/018411 | 2/2012 |
| WO | WO 2012/018412 | 2/2012 |
| WO | WO 2014/159785 | 10/2014 |

OTHER PUBLICATIONS

U.S. Appl. No. 12/723,667, Final Office Action mailed Dec. 23, 2013.
U.S. Appl. No. 12/723,667, Office Action mailed Oct. 3, 2013.
U.S. Appl. No. 12/723,667, Final Office Action mailed Apr. 10, 2013.
U.S. Appl. No. 12/723,667, Office Action mailed Dec. 6, 2012.
U.S. Appl. No. 12/723,667, Final Office Action mailed Aug. 16, 2012.
U.S. Appl. No. 12/723,667, Office Action mailed Feb. 15, 2012.
U.S. Appl. No. 12/850,136, Final Office Action mailed Oct. 31, 2013.
U.S. Appl. No. 12/850,136, Office Action mailed Apr. 15, 2013.
U.S. Appl. No. 12/899,085, Final Office Action mailed Mar. 5, 2013.
U.S. Appl. No. 12/899,085, Office Action mailed Oct. 8, 2013.
U.S. Appl. No. 12/913,694, Final Office Action mailed Aug. 29, 2013.
U.S. Appl. No. 12/913,694, Final Office Action mailed May 7, 2013.
U.S. Appl. No. 12/913,694, Office Action mailed Jan. 30, 2013.
U.S. Appl. No. 12/850,136, Office Action mailed Jan. 27, 2015.
U.S. Appl. No. 12/723,663, Final Office Action mailed Jan. 30, 2015.
U.S. Appl. No. 12/723,667, Office Action mailed Jan. 14, 2015.
U.S. Appl. No. 14/179,410, Final Office Action mailed Nov. 21, 2014.
U.S. Appl. No. 12/899,085, Final Office Action mailed Jan. 26, 2015.
U.S. Appl. No. 12/571,666, Office Action mailed Mar. 31, 2015.
PCT Application No. PCT/US2014/025131, International Search Report and Written Opinion mailed Jul. 11, 2014.
U.S. Appl. No. 12/723,666, Office Action mailed Jul. 18, 2014.
U.S. Appl. No. 12/899,085, Office Action mailed Sep. 12, 2014.
U.S. Appl. No. 14/179,410, Office Action mailed Aug. 11, 2014.
U.S. Appl. No. 12/571,666, Final Office Action mailed Feb. 28, 2014.
U.S. Appl. No. 12/723,663, Final Office Action mailed Jun. 16, 2014.
U.S. Appl. No. 12/723,667, Office Action mailed Jun. 2, 2014.
U.S. Appl. No. 14/207,637, Office Action mailed Jun. 23, 2014.
Chinese Application No. 201080050561.2, Office Action dated Mar. 31, 2014.
Chinese Application No. 201080050561.2, Second Office Action dated Oct. 23, 2014.
U.S. Appl. No. 12/723,663, Office Action mailed Oct. 7, 2014.
U.S. Appl. No. 14/207,637, Final Office Action mailed Oct. 17, 2014.
Chinese Application No. 201080050561.2, Third Office Action dated Mar. 30, 2015.
U.S. Appl. No. 12/723,666, Final Office Action mailed Apr. 9, 2015.
U.S. Appl. No. 12/723,663, Office Action mailed Sep. 15, 2015.
U.S. Appl. No. 12/899,085, Office Action mailed Aug. 19, 2015.
U.S. Appl. No. 14/860,526, Office Action mailed Dec. 30, 2015.
U.S. Appl. No. 12/723,667, Final Office Action mailed Oct. 23, 2015.
U.S. Appl. No. 14/207,637, Office Action mailed Nov. 10, 2015.

* cited by examiner

PROCTORED PERFORMANCE ANALYSIS

CROSS REFERENCE TO RELATED APPLICATIONS

The present application is a continuation-in-part and claims the priority benefit of U.S. patent application Ser. No. 12/571,666, filed on Oct. 1, 2009, entitled "Maintaining a Secure Computing Device in a Test Taking Environment," the disclosure of which is incorporated herein by reference.

BACKGROUND OF THE INVENTION

1. Field of the Invention

The present invention generally relates to online testing. More specifically, the present invention concerns administering and proctoring of a secure online exam which includes one or more practical examination tasks.

2. Description of Related Art

Examinations are used to determine the ability of an exam taker such as a student or prospective practitioner as it pertains to proficiency in a particular subject or skill set. For example, a student might take an exam to determine whether the student possesses requisite knowledge in a particular subject that might be related to receiving a degree or certificate. A prospective practitioner of law or medicine similarly might sit for an examination to determine their competence as it pertains to practicing in that profession.

Students or prospective practitioners have historically gathered at the designated locale for an examination on a proscribed date and time. Examination materials are then handed out by a testing authority and the exam begins. During the allotted time, the exam takers read questions and provide answers on a provided answer sheet or in a 'blue book.' Throughout the course of examination, a teacher or proctor keeps careful watch over the exam takers to ensure that no instances of cheating are taking place. While a single proctor may be able to observe a small group of exam takers, such observation becomes more difficult for a larger exam taking pool or for a group of exam takers utilizing laptop computers or other computing devices.

The increased popularity of distance learning has also complicated proctoring of examinations. The distance learning instructional model delivers education material and information to students who are not physically 'on site' at an education facility. Distance learning provides access to learning opportunities when the source of the information and the student are separated by time or distance if not both. Thousands of distance learners may be involved in a particular distance learning program or course at any given time.

Distance learning is no different than any other educational program in that there is a need to verify the qualifications of students through examination. Because distance learners are not collectively gathered at a physical learning institution such as a university, the distance learning program often requires that the students attend an examination center—which defeats a purpose of distance learning—or administers an examination online. An online examination is difficult to proctor as an exam taker could be taking an examination in one window of a web browser while looking up answers in another window via the Internet. An exam taker could also utilize a 'chat' or 'messaging' application to relay questions to and receive answers from a knowledgeable third-party. The value of online examinations is, therefore, questionable and calls into question the overall value of the corresponding class or degree program.

It can also be difficult to accurately evaluate an exam taker's knowledge or skill level in a particular subject through the use of an online examination. Specifically, due to ease of administration and relative objectivity, an online examination is typically implemented in a question-and-answer format using true/false questions, multiple-choice questions, and/or short-answer fill-in-the-blank questions. However, a question-and-answer format may not accurately indicate deficiencies in the exam taker's knowledge or skill level. For example, these exams may not indicate whether the exam taker possesses the requisite knowledge in a particular subject, or just guessed adequately enough to provide a sufficient number of correct responses to meet requirements associated with the exam.

Furthermore, an online examination in a question-and-answer format can be inadequate in other respects, such as in determining how well the exam taker can apply their knowledge in a real-world environment. In particular, the accuracy of question-and-answer based assessment is limited when what is being tested will eventually require practical "hands-on" proficiency. For example, answering questions relating to or involving the use of a software application may be inadequate, when proper use of the software application is what is required to demonstrate competence. Similarly, answering questions relating to or involving the use of a physical device suffers the same drawback. In addition, the evaluation of some learning styles, such as hands-on learning, may not lend themselves to online testing utilizing a question-and-answer format, and instead require a practical based approach. These drawbacks thus limit the usefulness of distance learning with regard to certain subjects.

There is a need in the art for administering and proctoring of a secure online exam which includes one or more practical hands-on examination tasks.

SUMMARY OF THE CLAIMED INVENTION

Systems and methods described herein provide for administering and proctoring of a secure online exam which allows for complex testing utilizing practical examination tasks. The practical examination tasks provide for evaluation of the knowledge of the exam taker, as well as the exam taker's ability to apply that knowledge in a real-world environment. By performing the practical examination tasks in the context of a secure online exam, the competence of the test taker can be readily determined without worrying about the exam taker illicitly accessing information on their computer or via a remote source of data. The exam taker may perform the practical examination tasks through manipulation of an evaluation application executing on the exam taker's secured computer. The practical examination tasks may also be carried out through manipulation by the exam taker of an evaluation apparatus coupled to the exam taker's secured computer.

A system is described herein for administration of a secure examination via a network. The system includes a testing server coupled to the network that provides testing data for the examination. A first computing device is coupled to the network and receives the testing data to execute a testing routine for the examination. The first computing device also executes a secure testing application that implements security limitations for the first computing device during the testing routine. The first computing device further provides interaction data indicating manipulation by a user of the first computing device in performing one or more practical examination tasks during the testing routine. The system also includes a second computing device coupled to the network that receives the interaction data in order to determine competence of the user in the one or more practical examination tasks.

A method is described herein for administration of a secure examination via a network. The method includes providing testing data for the examination during execution of a testing routine on a computing device. The testing data is provided over the network and includes security limitations for the computing device during the testing routine. Interaction data is then received over the network, the interaction data indicating manipulation by a user of the computing device in performing one or more practical examination tasks during the testing routine. The received interaction data is then analyzed to determine competence of the user in the one or more practical examination tasks.

A computer readable storage medium as described herein has embodied thereon a program, the program being executable by a processor to perform a method as described above for administration of a secure, proctored examination via a network.

DETAILED DESCRIPTION

Figure 1:
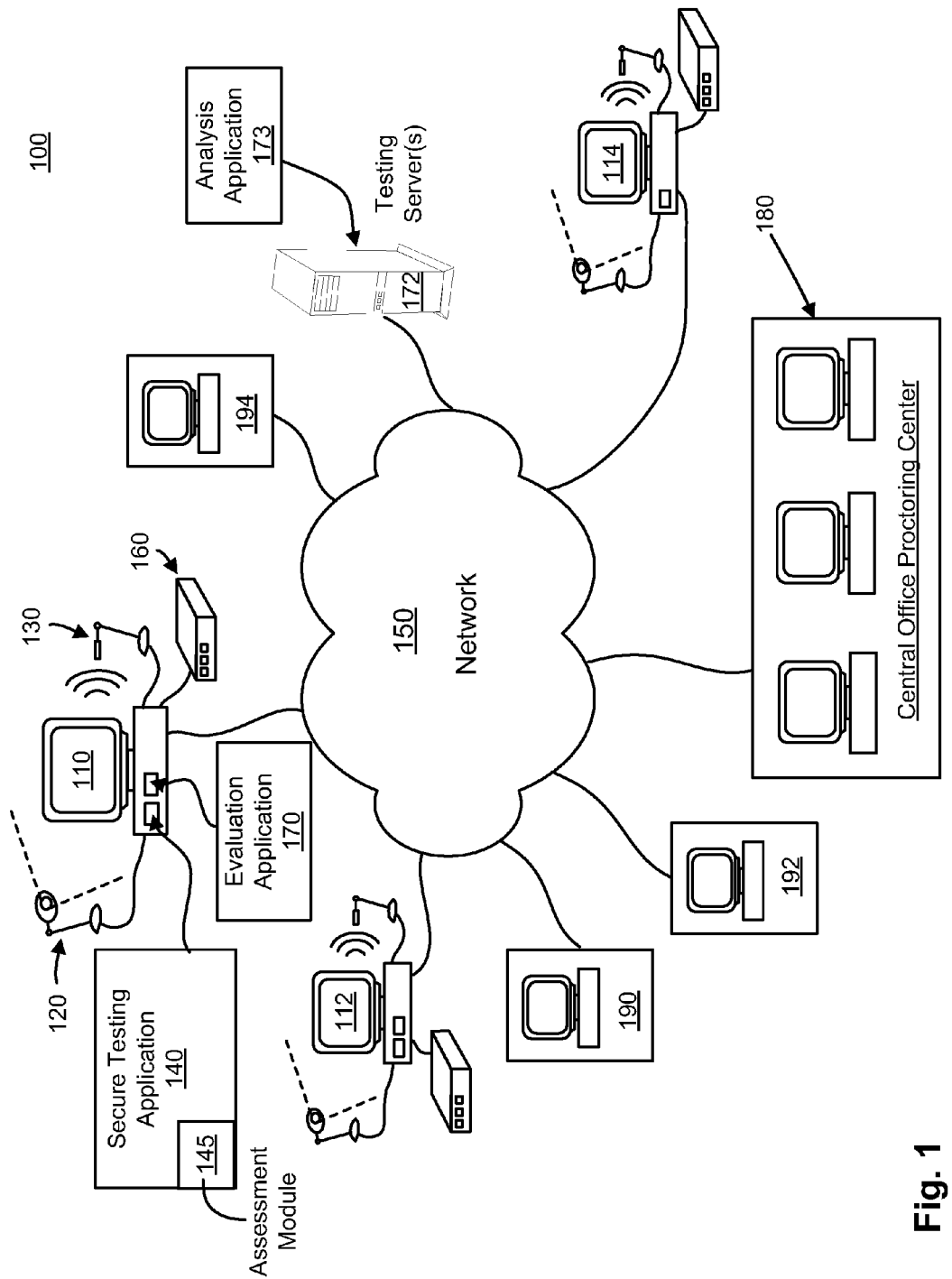
FIG. 1 illustrates a system for administering and proctoring of a secure online exam which includes one or more practical examination tasks.

Systems and methods described herein provide for administering and proctoring of a secure online exam which allows for complex testing utilizing practical examination tasks. The secure online exam may also include exam questions. An exam question may be a multiple-choice question, a true/false question, an essay question, or any other type of question an exam taker is asked to answer. In contrast, a practical examination task is a task or exercise an exam taker is asked to perform.

The practical examination tasks provide for evaluation of the knowledge of the exam taker, as well as the exam taker's ability to apply that knowledge in a real-world environment. By performing the practical examination tasks in the context of a secure online exam, the competence of the test taker can be readily determined without worrying about the test taker illicitly accessing information on their computer or via a remote source of data.

The exam taker may perform the practical examination tasks through manipulation of an evaluation application executing on the exam taker's secured computer. For example, the practical examination task may be a task or scenario the exam taker is asked to complete through the use of the evaluation application. The evaluation application may for example be a commercially available application such as a web browser, a word processing application, or any other software application which can be manipulated by the exam taker to perform a practical examination task. The evaluation application may alternatively be created by the testing administrator or otherwise developed specifically for administration of the online exam.

Practical examination tasks may also or alternatively be carried out through manipulation by the exam taker of an evaluation apparatus coupled to the exam taker's secured computer. The evaluation apparatus may for example be physically manipulated by the exam taker to perform the practical examination tasks. The evaluation apparatus may alternatively be manipulated by the exam taker via user input to an evaluation application which controls the evaluation apparatus. Manipulation may include turning on or off the evaluation apparatus, configuring the evaluation apparatus, attaching or otherwise coupling the evaluation apparatus to other devices, operating the evaluation apparatus, providing user input to the evaluation apparatus, reading or otherwise receiving output from the evaluation apparatus, or otherwise using the evaluation apparatus to perform a practical examination task in the context of the online exam. The evaluation apparatus may for example be an electrical device, laboratory experiment equipment, a medical device, or any other type of physical device which can be manipulated directly and/or remotely by the exam taker and otherwise communicatively integrated with the computing device of the test taker (e.g., through a USB port and USB cable, through the introduction of a memory card exchanged between the apparatus and computing device, or through a wireless or Bluetooth connection).

Securing a computing device includes locking out or preventing access to any application or hardware not deemed necessary or appropriate by the exam administrator. Securing a computing device may further include allowing the test administrator access to the computing device before or during the examination. By granting access to the computing device, the test administrator may search for illicit files related to the examination or make determinations as to whether the exam taker has attempted to disable (or has disabled) certain functionality as it relates to locking out unnecessary or inappropriate applications on the computing device. Securing the computing device further includes allowing for dynamic locking and unlocking of an evaluation application and/or an evaluation apparatus pertaining to the practical examination tasks.

A video camera device or other visual and/or audio environment capture device may be used to generate data of the examination environment surrounding the exam taker. A remote proctor may view the data in real time, and determine if any visual or audio activity in the examination environment constitutes activity not in accordance with the exam protocol.

FIG. 1 illustrates a system 100 for administering and proctoring of a secure online exam which includes one or more practical examination tasks. The system 100 of FIG. 1 includes computing devices 110, 112, 114 that may be utilized by a user (exam taker) to take an examination, testing server 172 for administering an examination via a communications network 150, a central office proctoring center 180, and geographically distributed proctoring centers 190, 192, 194.

The computing devices 110, 112, 114 may be any sort of computing device as is known in the art. The computing devices 110, 112, 114 include memory for storage of data and software applications, a processor for accessing data and executing applications, and input and output devices that allow for user interaction. The computing devices 110, 112, 114 further include components that facilitate communication over the communications network 150 such as an RJ-45 connection for use in twisted pair based 10baseT networks or a wireless network interface card allowing for connection to a radio-based communication network (e.g., an 802.11 wireless network).

The computing devices 110, 112, 114 may be a general purpose computing device such as a desktop or laptop computer. The computing devices 110, 112, 114 may belong to a particular user rather than being a computing device dedicated to exam taking as might be found in a examination center. Thin client or netbook client devices may be implemented in the context of computing devices as might mobile computing devices such as smart phones.

Communication network 150 may be a local, proprietary network (e.g., an intranet) and/or may be a part of a larger wide-area network. The communication network 150 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communication network 150 allows for communication between the various components of system 100.

The computing device 110 is representative of the computing devices 110, 112, 114. As described below, an evaluation application 170 executable by the computing device 110 may be manipulated by the exam taker to perform one or more practical examination tasks during administration of an examination. Practical examination tasks may also or alternatively be carried out through manipulation by the exam taker of an evaluation apparatus 160 coupled to the computing device 110. The computing device 110 provides interaction data indicating the manipulation by the exam taker in performing the practical examination tasks. This interaction data can then be analyzed by an analysis application 173 executing on the testing server 172 to determine competence of the exam taker as it pertains to the practical examination tasks. Alternatively, the interaction data may be manually analyzed by a person to evaluate how well the exam taker has performed the practical examination tasks.

The testing server 172 is coupled to the communication network 150. The testing server 172 is a computing device which includes memory, a processor for accessing data and executing applications, and components to facilitate communication over communications network 150. The testing server 172 is tasked with transmitting and receiving exam content during the administration and proctoring of an examination.

The exam content includes testing data such as the actual exam (e.g. prompts for practical examination tasks, questions, etc.) or other data concerning an exam, as well as answers to the questions and the interaction data provided by the computing devices 110, 112, 114 during an examination. Registration information of the exam takers, such as a name or examination identification number as well as a password, may also be stored in the testing server 172.

Biometric information such as a visual image of the exam taker may also be stored in the testing server 172 and compared against a previously stored and known 'good' image of the exam taker. A similar comparison may be made with respect to a voice print. Retinal scans and finger prints, subject to the presence of the appropriate peripheral device, may also be stored and used for verifying exam taker identity. These peripheral devices may be implemented in the context of the use of video camera device 120, microphone 130, or other environment capture device.

The testing server 172 also manages the real-time upload and distribution of data streams of the examination environments captured from visual and/or audio capture devices coupled to the computing devices 110, 112, 114. The visual and/or audio capture devices are used to monitor the exam taking environment surrounding the exam taker during administration of the exam. The data stream may be transmitted in real-time to the central office proctoring center 180, and/or one or more geographically distributed proctoring centers 190, 192, 194. A proctor may then view the data stream via a streaming technique in real-time (i.e., during administration of the examination), and determine if any visual activity in the examination environment constitutes activity not in accordance with the exam protocol. The testing server 172 may also store the data streams for retrieval and playback in a non-streaming fashion.

The testing server 172 may for example operate as an origin server for the exam content, and be implemented in conjunction with a distributed server network such as a content delivery network (CDN). See, commonly-owned U.S. patent application Ser. No. 12/850,136, the disclosure of which is incorporated herein by reference.

Central office proctoring center 180 is an operations center with computing devices staffed with one or more proctors observing the data streams of various examination environments for exam takers at one or more examination sites. These examination sites may be physically remote from the central office proctoring center 180. Examination sites can be examination centers dedicated to the offering of examinations, traditional classroom settings, as well as personal space such as a home or office workspace. The geographically distributed proctoring centers 190, 192, 194 include computing devices which may belong to a particular proctor, rather than being a computing device dedicated to proctoring as might otherwise be found in the central office proctoring center 180. The proctors at the central office proctoring center 180 and geographically distributed proctoring centers 190, 192, 194 may observe and analyze a variety of different types of information to help ensure the integrity of the examination.

The computing devices 110, 112, 114 are secured in order to prevent access to files or other types of data such as notes, outlines, and exam preparation material during an examination, as well as preventing access to applications that themselves allow for access to data.

The computing devices 110, 112, 114 are secured for the taking of an exam through the installation and subsequent execution of a secure testing application (e.g., secure testing application 140 installed on computing device 110). Computing device 110 is representative of the computing devices 110, 112, 114. Secure testing application 140 may be downloaded from the testing server 172 or another computing device coupled to the communication network 150. Secure testing application 140 may also be installed from a computer-readable storage device such as a CD-ROM. The secure testing application 140 may then be stored in memory at the corresponding computing device 110 and executed by a processor to invoke its corresponding functionality.

Secure testing application 140 is a security application software that prevents computing device 110 from accessing certain data or applications that might otherwise be in violation of examination regulations or protocols as identified by testing server 172. The security application software 140 causes the computing device 110 to operate in a secure mode by introducing certain changes to the system registry such that only those applications or files deemed necessary or appropriate by the exam administrator and as embodied in a corresponding exam protocol may be allocated address space, loaded into memory and ultimately executed by the computing device 110.

For example, an exam protocol for a particular examination may deny access to a web browser, e-mail client, and chat applications such that an exam taker may not electronically communicate with other individuals during the examination. This particular protocol may be downloaded to the computing devices 110 from the testing server 172 along with testing data. The secure testing application 140 then operates in accordance with the downloaded testing protocol such that certain applications are not allowed to be loaded and executed. Because the applications that may be installed on a computing device are all but infinite, the testing protocol may identify those applications that an exam taker is allowed to access rather than those applications to which access is prohibited.

Similar prohibitions or permissions may apply to hardware components of the computing device 110 as well as any number of hardware peripherals that might be introduced to the computing devices 110. Examples of such peripherals that might be introduced include a second computer monitor, docking stations, a traditional full-sized keyboard as might be used with a laptop computer. Other peripherals might include thumb drives, 'time-shift' recording devices that offer TiVo®-like functionality, as well as any number of other plug-and-play peripherals.

A particularly apt example with respect to hardware at the computing device 110 concerns network connectivity. Network connectivity may be allowed prior to commencing an examination such that certain data may be downloaded. This data may include the actual test (e.g., prompts and questions) or other data concerning a test. Once the certain data is downloaded, however, network connectivity may be deactivated through 'locking out' a network card until the test is completed and the network card is released.

In other instances, however, network connectivity may be maintained throughout the course of the examination. This may be particularly relevant to a scenario where testing data is maintained at the testing server 172 and only displayed at the computing device 110. In such an instance, the test data itself may never be stored or downloaded at the computing device 110. In these and similar scenarios, it may be necessary to allow only certain data to be exchanged over the network connection. This would include both incoming and outgoing data.

The secure testing application 140 may also operate in conjunction with the testing server 172 to properly execute a testing routine for the given examination event. For example, the testing routine may allow for the user to have access to all questions at any given time such that the user may answer and not answer questions at their leisure and subsequently return to any questions at a later time for further review. The testing routine may alternatively require the exam taker to lock in an answer or set of answers and have the same reported to the testing server 172 prior to receiving a subsequent question.

In instances where the secure testing application 140 allows access to certain applications on computing device 110, the functionalities of those applications may be limited. For example, a testing protocol may allow for activation of a web browser and network connectivity, but only to a single secure site providing testing data. The protocol may further or alternatively allow for exchanges of only certain types of data or data that has been certified for exchange. Such 'certifications' may include the presence of certain headers in the data or the data having been encrypted in a particular fashion.

Similarly, the 'print' function of a particular application may be disabled. The testing protocol may include instructions on how certain application programming interfaces (APIs) for certain software applications are to be implemented or disabled by the secure testing application 140. Drivers may be managed in a similar fashion (e.g., a printer driver).

Access to certain applications, hardware, or functionality may be disabled or limited for a particular portion of an examination. For example, as noted above, a network interface card may be temporarily disabled after an initial download of data. Once the exam is complete, however, the network card may be re-enabled to allow for transmission of data or to allow for the free and general exchange of data rather than a more limited set under the control of the secure testing application 140.

The occurrence of certain milestones or events during a testing event may correspond to the enablement or disabling of hardware, software, or specific application functionality. For example, print functionality may be disabled during an examination to prevent a test taker from printing a copy of the examination and then delivering the copy to a friend so that they may review the questions before they take the examination. The functionality may be enabled, however, to allow the user to keep a copy of their answers sans the questions. The functionality may be re-enabled once an exam taker clicks on a 'Test Complete' button or icon that locks in the test taker's answers and prevents them from being further manipulated once certain computing device 110 hardware, software or functionality has been re-enabled that was otherwise disabled during the examination.

The secure testing application 140 may also observe activity on the computing device 110 during administration of an examination. If an exam taker attempts to make changes to the system registry that were implemented by the secure testing application 140, the secure testing application 140 may identify and report these attempts to the central office monitoring center 180, and distributed proctor monitoring centers 190, 192, 194.

The secure testing application 140 may operate in conjunction with video camera device 120 or other visual and/or audio capture device to monitor the exam environment surrounding the exam taker of the computing device 110. Video camera device 120, which may be a commercially available web camera or other image acquisition device, generates a real-time data stream of the exam environment. If the exam taker leaves their seat or another individual enters the exam area during the course of the examination, the video camera device 120 will capture this visual information. The video camera device 120 provides the data stream to the secure testing application 140. The secure testing application 140 encodes and uploads the captured data stream into the testing server 172. The testing server 172 in turn delivers the data stream to the central office monitoring center 180, and/or one or more geographically distributed proctor monitoring centers 190, 192, 194, during the administration of the examination.

A proctor at the central office monitoring center 180 and/or the proctor monitoring centers 190, 192, 194 may then view the data stream provided by the testing server 172 and determine if any visual activity constitutes activity not in accordance with the exam protocol. The proctor may then log the information for further assessment by the actual exam administrator (e.g., the professor or professional association administrating the examination) or make a direct inquiry of the exam taker as to the nature of the observed behavior, and/or provide a warning as to terminate that behavior. Other external devices may also be used to gather environment data that can be provided in the encoded data stream uploaded to the testing server 172, such as a microphone 130 or other environment capture device.

The secure testing application 140 may operate in conjunction with the evaluation application 170 so that the exam taker can perform practical examination tasks in connection with the online exam. In the illustrated embodiment, the exam taker performs the practical examination tasks through manipulation of the evaluation application 170 executing on the computing device 110. Alternatively, the evaluation application 170 may be hosted at the testing server 172 or some other computing device coupled to the communications network 150. In yet other alternative embodiments, the stand-alone evaluation application 170 may be omitted and a 'virtual' instance of the evaluation application 170 provided through the use of the secure testing application 140. In such a case, the exam content which indicates the appropriate interface, interactions and nuances of the evaluation application 170 may be provided by the testing server 172 for use by the secure testing application 140.

The practical examination task may be a task or scenario the exam taker is asked to complete through the use of or otherwise utilizing the evaluation application 170. For example, the practical examination task may involve configuring the evaluation application 170, or otherwise performing a complex process on the computing device 110. An assessment module 145 of the secure testing application 140 captures or otherwise receives interaction data indicating the manipulation by the exam taker in performing the practical examination task. The assessment module 145 provides interaction data to the testing server 172 to evaluate the competence of the exam taker. As a result, the exam taker's ability to apply knowledge in a real-world environment can be evaluated by seeing whether the exam taker can modify the assessment application 170 to complete the task or scenario.

As an example, the evaluation application 170 may be an e-mail application such as Microsoft Outlook®, and the practical examination task may involve setting up the e-mail application to work with a particular email account. The exam taker then performs the task by navigating through the various menus, prompts and windows in the user interface of Microsoft Outlook®, selecting the appropriate settings, and inputting the e-mail account information necessary to complete the setup. The assessment module 145 may for example obtain interaction data regarding the setup of the e-mail account by capturing the keystrokes input by the exam taker during use of the e-mail application. As another example, the assessment module 145 may obtain interaction data by examining the disk image file of the computing device 110, or any other file associated with the setting up of the e-mail account.

The evaluation application 170 may be enabled, launched and then disabled automatically by the secure testing application 140 in accordance with the exam protocol. Alternatively, the exam taker may be prompted to manually launch the evaluation application 170 during a particular portion of an examination.

The evaluation application 170 may be placed automatically into a particular state by the secure testing application 140 as defined by the exam protocol. In such a case, the exam taker can be presented with a well controlled testing environment with which to begin a practical examination task.

The manipulation of the evaluation application 170 by the exam taker to perform a practical examination task may include user input via an interface of the evaluation application 170 which creates or modifies data associated with the evaluation application 170. For example, the exam taker may provide user input via a keyboard or other input device of the computing device 110 to change the state of the evaluation application 170. This may include creating, modifying or deleting files stored in memory in the computing device 110 which are associated with the evaluation application 170.

The evaluation application 170 may for example be a commercially available application such as a web browser, a word processing application, or any other software application which can be manipulated via user input by the exam taker. The evaluation application 170 may alternatively be created by the testing administrator or otherwise developed specifically for administration of the online exam.

The assessment module 145 provides interaction data to the testing server 172 indicating the manipulation of the evaluation application 170 by the exam taker. The interaction data may for example be in the form of one or more data files which were created or modified by the exam taker during use of the evaluation application 170 in performing the practical examination task. Alternatively, other techniques may be used for obtaining the interaction data. For example, the interaction data may be generated by the evaluation application 170 in response to the user input. As another example, the assessment module 145 may obtain the interaction data by capturing the keystrokes input by the exam taker during use of the evaluation application 170.

Practical examination tasks may also or alternatively be performed by the exam taker through manipulation of an evaluation apparatus 160 coupled to the computing device 110. Use of the evaluation apparatus 160 may be enabled and disabled automatically by the secure testing application 140 in accordance with the exam protocol. For example, the secure testing application 140 may enable or disable the operability of a port (e.g., a universal serial bus port) of the computing device 110 used to connect to the evaluation apparatus 160.

The evaluation apparatus 160 may for example be physically manipulated by the exam taker to perform the practical examination tasks. The evaluation apparatus 160 may alternatively be manipulated by the exam taker via user input to the evaluation application 170 which controls the evaluation apparatus 160. In such a case, the evaluation application 170 may provide configuration data to control the evaluation apparatus 160 based on the user input.

Manipulation may include turning on or off the evaluation apparatus 160, configuring the evaluation apparatus 160, attaching or otherwise coupling the evaluation apparatus 160 to other devices, operating the evaluation apparatus 160, providing user input to the evaluation apparatus 160, reading or otherwise receiving output from the evaluation apparatus 160, or otherwise using the evaluation apparatus 160 to perform a task in the context of the online exam.

As an example, the evaluation apparatus 160 may be a router, and the practical examination task may involve setting up the router as part of a local area network. To perform the task, the exam taker connects the router to the computing device 110, and turns on the router. The exam taker would then run through set up and configuration of the router using the router's administration application (i.e., evaluation application 170). This set up and configuration by the exam taker may involve providing user input to log in to the router, configure settings and security features of the router, and enter local area network information such as the SSID, as well any additional information necessary to setup the router as part of the local area network.

The assessment module 145 may for example obtain interaction data regarding the setup of the router by capturing the keystrokes input by the exam taker during use of the router's administration application. As another example, the assessment module 145 may obtain interaction data by verifying that the network connection through the use of the router is working. For example, the assessment module 145 may verify that the network connection is working by confirming that the computing device 110 has received IP address information from the router.

The evaluation apparatus 160 may for example be an electrical device, laboratory experiment equipment, a medical device, or any other type of physical device which can be manipulated directly and/or remotely by the exam taker. The evaluation apparatus 160 may for example be a commercially available device or system. The evaluation apparatus may alternatively be created by the testing administrator or otherwise developed specifically for administration of the online exam.

The evaluation apparatus 160 may be placed into a particular state by the secure testing application 140 as defined by the exam protocol. In such a case, the exam taker can be presented with a well controlled testing environment with which to begin a practical examination task.

The secure testing application 140 may also implement security limitations to operate the evaluation apparatus 160 in a secure mode. For example, if the evaluation apparatus 160 is a device which includes a system registry that stores settings and options for a particular operating system installed on the evaluation apparatus 160, the secure testing application 140 may introduce certain changes to the system registry such that only those applications or files deemed necessary or appropriate by the exam administrator are executed. Similar prohibitions or permissions may apply to hardware components or functionality of the evaluation apparatus 160 as well as any number of hardware peripherals that might be introduced to the evaluation apparatus 160. The secure testing application 140 may further allow for exchanges of only certain types of data or data that has been certified for exchange with the evaluation apparatus 160.

The secure testing application 140 may also observe activity on the evaluation apparatus 110 during administration of an examination. If an exam taker attempts to make changes\that were implemented by the secure testing application 140, the secure testing application 140 may identify and report these attempts to the central office monitoring center 180, and distributed proctor monitoring centers 190, 192, 194.

The assessment module 145 provides interaction data to the testing server 172 indicating the manipulation of the evaluation apparatus 160 by the exam taker. The interaction data may for example be in the form of one or more data files which were created or modified by the exam taker during use of the evaluation apparatus 160 in performing the practical examination task. Alternatively, other techniques may be used for obtaining the interaction data. For example, the interaction data may be generated by the evaluation apparatus 160 in response to user input, such as the pressing of certain buttons or the performance of certain measurements using the evaluation apparatus 160.

In the illustrated embodiment, the evaluation apparatus 160 is directly connected to the computing device 110. In other words, the evaluation apparatus 160 is located in the examination environment surrounding the exam taker. In some embodiments, the evaluation apparatus 160 may be physically remote from the computing device 110. In such a case, the evaluation apparatus 160 may be coupled to the computing device 110 via the communications network 150. For example, the evaluation apparatus 160 may be laboratory equipment located in a remote lab. The exam taker may then remotely manipulate the evaluation apparatus 160 in the context of the online examination through the use of the evaluation application 170.

Figure 2:
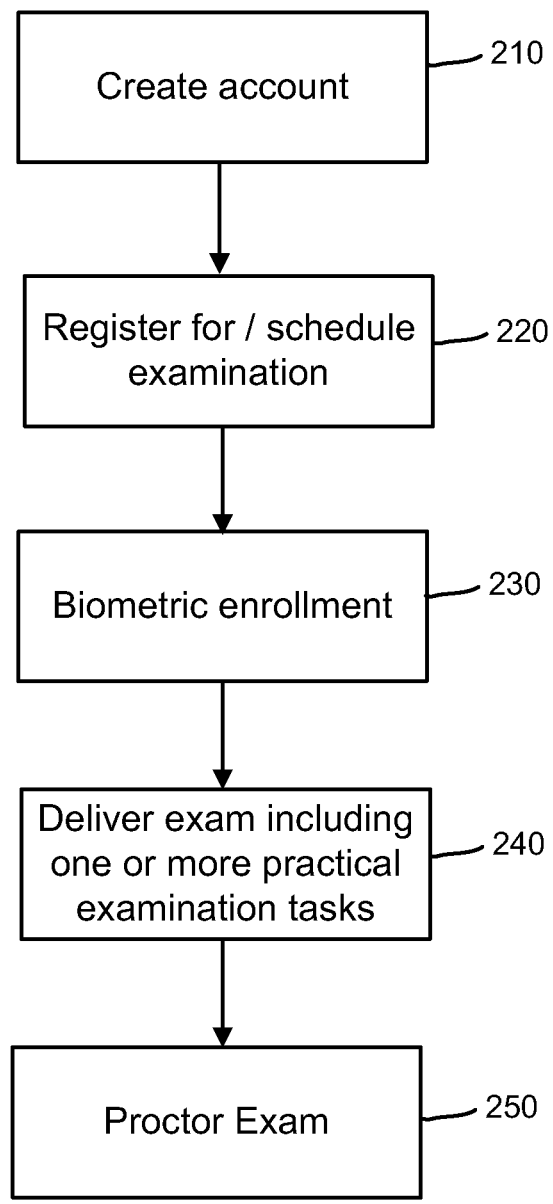
FIG. 2 illustrates a method for implementing a secure online exam which includes one or more practical examination tasks.

FIG. 2 illustrates a method 200 for implementing a secure online proctored exam which includes one or more practical examination tasks. In step 210, an account is created by an exam taker. In step 220, an exam taker registers for and/or schedules an examination. In step 230, an exam taker engages in biometric enrollment and authentication. The aforementioned steps may be carried out as described in U.S. patent application Ser. No. 12/723,667 entitled "Secure Online Testing," the disclosure of which is incorporated herein by reference.

In step 240, the exam which includes one or more practical exam tasks is delivered. The delivery of the exam will be described in more detail below with respect to FIG. 3.

Proctoring step 250 takes place over the course of the examination and may be implemented as part of step 240. The proctoring step 250 utilizes a variety of security technologies and processes to deter and detect aberrance during the exam process. In particular, the exam taking environment surrounding the exam taker may be monitored in real-time by a proctor utilizing a live video feed of the exam taker. The live video feed can be captured utilizing a video camera device or other visual and/or audio environment capture device as described above. The proctoring step 250 may be carried out as described in commonly-owned U.S. patent application Ser. No. 12/850,136, the disclosure of which was previously incorporated by reference.

Figure 3:
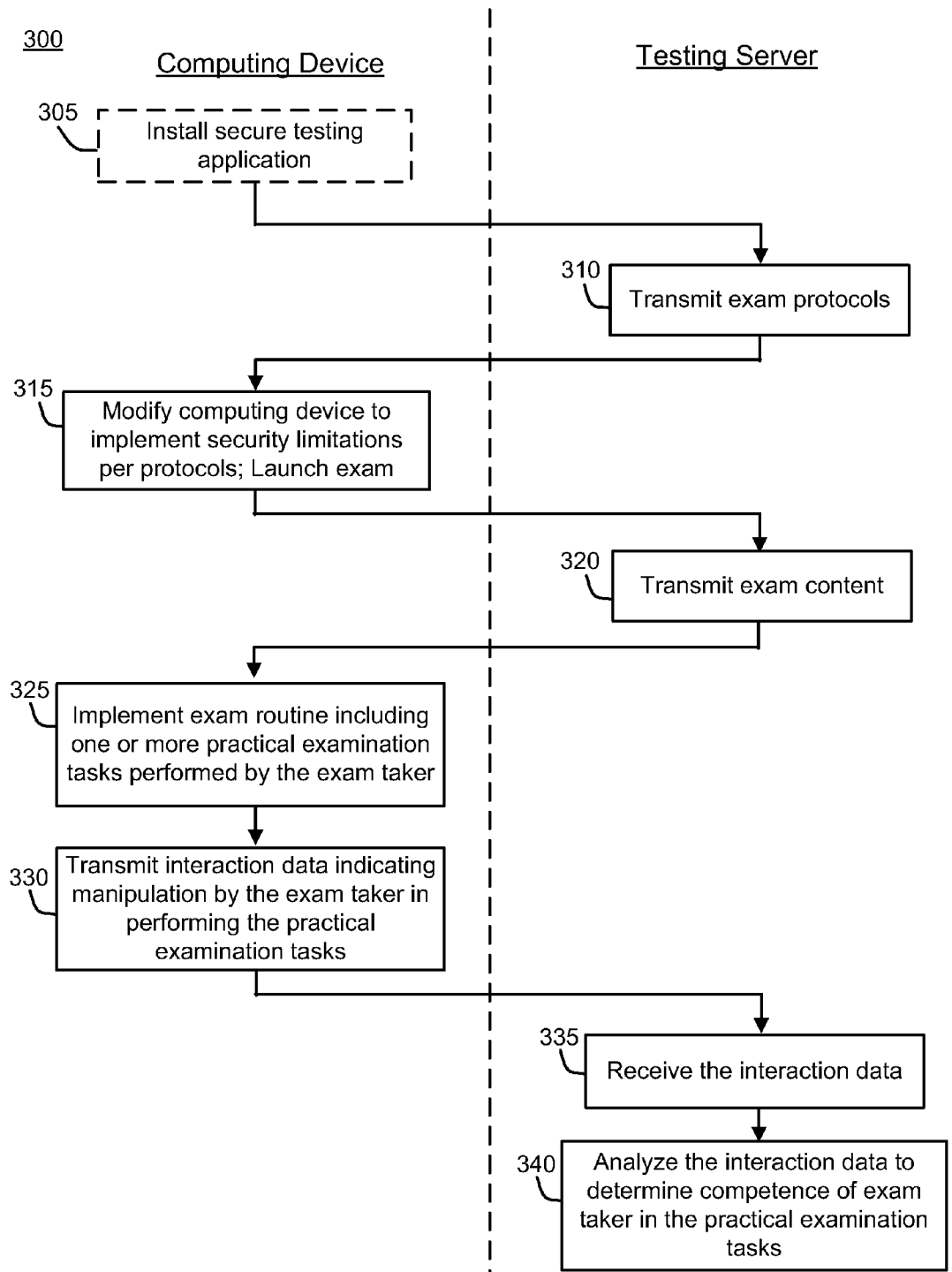
FIG. 3 illustrates a method for administering a secure online exam which includes one or more practical examination tasks.

FIG. 3 illustrates a method 300 for administering a secure online exam which includes one or more practical examination tasks. At step 305, if the secure testing application 140 is not installed on the computing device 110, the secure testing application 140 is installed. Secure testing application 140 may be downloaded from the testing server 172 or another computing device coupled to the communication network 150. Secure testing application 140 may also be installed from a computer-readable storage device such as a CD-ROM.

The need to acquire the secure testing application 140 may be previously communicated to the exam taker or may be indicated when the exam taker attempts to access the testing server 172, but lacks the proper credentials to do so as the exam taker has not been authenticated by the secure testing application 140.

As described above, in some embodiments the exam taker performs the practical examination tasks through manipulation of the evaluation application 170 executing on the computing device 110. In such a case, if not already installed, the evaluation application 170 may also be installed at step 305 similar to techniques described above regarding the installation of the secure testing application 140.

Following enrollment and authentication of the exam taker, at step 310 the testing server 172 transmits the exam protocols to the computing device 110. These exam protocols are related to the security of the testing event. Some protocols may be universal and pre-implemented in the secure testing application 140 such as requiring authentication of an exam taker prior to commencing an examination.

At step 315, the testing protocols are implemented with respect to various hardware, software, and functional aspects of the computing device 110. Implementing the testing protocols may include modifying the system registry of the computing device 110 to prevent certain hardware, software, or other functionality from being implemented. These changes may be 'undone' once the once the secure testing application 140 completes its execution (i.e., the test is complete). As such, the secure testing application 140 may maintain a record of changes it makes to the system registry to allow for proper editing back to an original setting. These records may also be maintained in order to allow the secure testing application 140 to make a determination whether any attempt to circumvent the exam protocols have been made.

In embodiments in which the exam taker performs the practical examination tasks through manipulation of the evaluation apparatus 170, the testing protocols may be also be implemented with respect to various hardware, software, and functional aspects of evaluation apparatus 170.

At step 320, the exam content including testing data such as the prompts and questions, or other data concerning the exam, are transmitted by the testing server 172 to the computing device. At step 325, the testing routine including one or more practical examination tasks are implemented in accordance with various exam protocols and exam content. The testing routine will be described in more detail with respect to FIGS. 4 to 5.

At step 330, the interaction data indicating the manipulation by the exam taker in performing the examination tasks is transmitted by the computing device 110 to the testing server 172. Step 330 may further include delivery of exam answers back to the testing server 172.

In step 330, violations of exam protocols may also be reported to the testing server 172, the central office proctoring center 180, and/or one or more geographically distributed proctoring centers 190, 192, 194. Data related to violations may be captured by video camera device 120, microphone 130, or other environment capture device. Data related to attempts to circumvent registry changes related to maintaining the security of the computing device 110 and the evaluation apparatus 160 may likewise be reported. Violations may be reported as they occur in real-time, on-demand in response to a proctor query, or part of a regular batch of data.

At step 335, the interaction data along with any other data concerning the exam is received by the testing server 172. At step 340, the interaction data is analyzed to determine competence of the exam taker in the practical examination tasks. As an example, the interaction data may be in the form of a file which was modified by the exam taker in performing the practical examination task. In such a case, determining the competence of the exam taker may be based on these modifications to the file.

In the illustrated embodiment, this analysis is performed by the analysis application 173 executing on the testing server 172. The analysis application 173 may automatically compare the interaction data to benchmark data stored in the testing server 172 to determine the competence of the exam taker. Alternatively, the interaction data may be manually analyzed by a person to evaluate how well the exam taker has performed the practical examination tasks.

The determination of the competence of the exam taker may be based on the similarity between the interaction data and the benchmark data. The amount of similarity corresponding to a particular 'score' for the exam taker may be defined by the exam authority. For example, the exam taker may be assigned a certain number of points indicating how well the exam taker performed a practical examination task. As another example, the 'score' may simply indicate whether the exam taker passed or failed the practical examination task.

Figure 4:
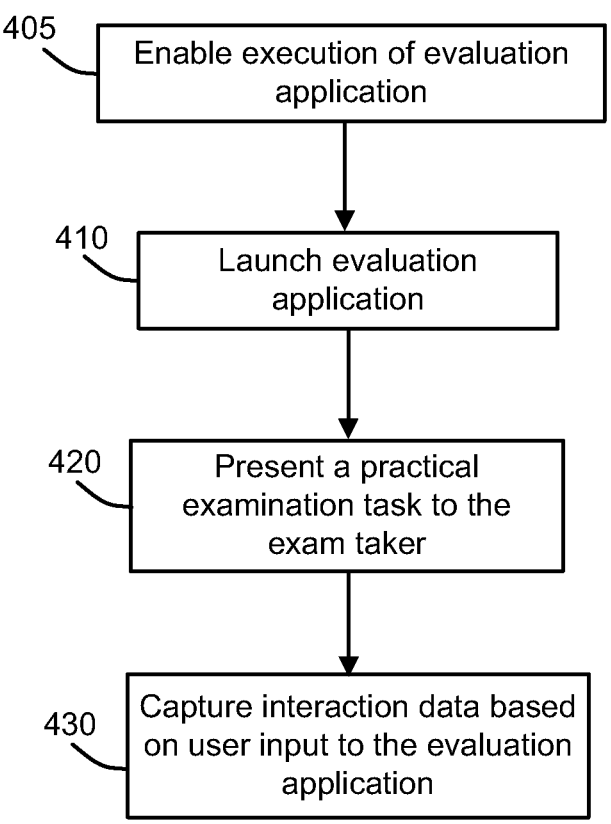
FIG. 4 illustrates a method for implementing a testing routine which includes a practical examination task.

FIG. 4 illustrates a method 400 for implementing a testing routine which includes a practical examination task. In FIG. 4, the exam taker performs the practical examination tasks through manipulation of the evaluation application 170 executing on the computing device 110.

At step 405, the secure testing application 140 enables execution of the evaluation application 170 so that the exam taker can perform the practical examination task. In the illustrated embodiment, the secure testing application 140 enables execution of the evaluation application 170 by introducing certain changes to the system registry of the computing device 110. Step 405 may correspond to the occurrence of certain milestones or events during the exam.

At step 410, the evaluation application 170 is launched. The assessment application 170 may be launched automatically by the secure testing application 140 in accordance with the exam protocol. Alternatively, the exam taker may be prompted to manually launch the evaluation application 170 during a particular portion of an examination.

The evaluation application 170 may be placed automatically into a particular state by the secure testing application 140 as defined by the exam protocol, such as by loading a stored file. In such a case, the exam taker can be presented with a well controlled testing environment with which to begin a practical examination task.

At step 420, the exam taker is presented with a practical examination task to be performed. The secure testing application 140 may present the practical examination task by displaying information to the exam taker indicating the task that the exam taker must perform. At step 430, the interaction data is captured by the assessment module 145 based on the user input to the assessment application 170.

Figure 5:
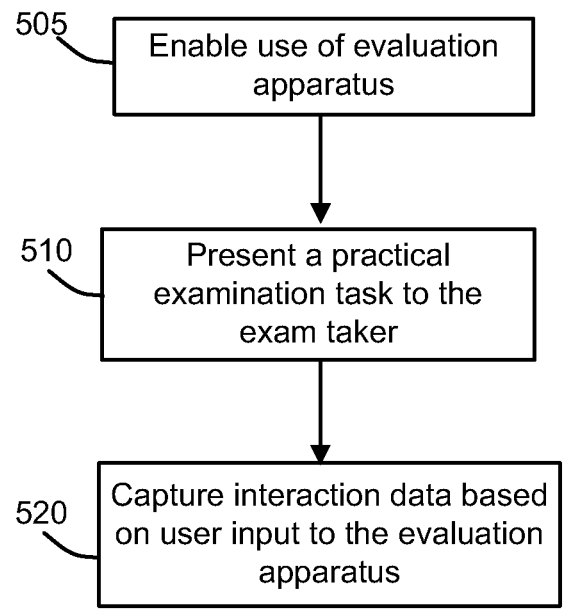
FIG. 5 illustrates a second method for implementing a testing routine which includes a practical examination task.

FIG. 5 illustrates a second method 500 for implementing a testing routine which includes a practical examination task. In FIG. 5, the exam taker performs the practical examination tasks through manipulation of the evaluation apparatus 160 coupled to the computing device 110.

At step 505, the secure testing application 140 enables use of the evaluation apparatus 160 so that the exam taker can perform the practical examination task. In the illustrated embodiment, the secure testing application 140 enables use of the evaluation apparatus 160 by introducing certain changes to the system registry of the computing device 110. For example, the secure testing application 140 may enable or disable the operability of a port (e.g., a universal serial bus port) of the computing device 110 used to connect to the evaluation apparatus 160. Step 505 may correspond to the occurrence of certain milestones or events during the exam.

The evaluation apparatus 160 may be placed automatically into a particular state by the secure testing application 140 as defined by the exam protocol. In such a case, the exam taker can be presented with a well controlled testing environment with which to begin a practical examination task.

At step 510, the exam taker is presented with a practical examination task to be performed. In one embodiment, the secure testing application 140 presents the practical examination task by displaying information to the exam taker indicating the task that the exam taker must perform.

At step 520, the interaction data is captured by the assessment module 145 based on the user input to the evaluation apparatus 160. For example, the interaction data may be generated by the evaluation apparatus 160 in response to user input, such as the pressing of certain buttons or the performance of certain measurements using the evaluation apparatus 160. In some embodiments, the interaction data is also or alternatively captured based on the response of the evaluation apparatus 160 to the user input.

Other techniques may also be used for providing user input to the evaluation apparatus 160. For example, the evaluation apparatus 160 may alternatively be manipulated by the exam taker via user input to the evaluation application 170 which controls the evaluation apparatus 160. In such a case, the evaluation application 170 may provide configuration data to control the evaluation apparatus 160 based on the user input.

This configuration data may also be provided as interaction data by the assessment module 145.

Computer-readable storage media refer to any non-transitory storage medium and that may allow for instructions to be provided to a central processing unit (CPU) for execution. Such media can take many forms, including, but not limited to, non-volatile and volatile media such as optical or magnetic disks and dynamic memory, respectively. Common forms computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Computer-readable storage medium, which are non-transitory in nature, differ from the various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims.

What is claimed is:

1. A system for administration of a secure examination via a network, the system comprising:
    a testing server that provides testing data for the examination;
    an evaluation apparatus manipulatable by a user to perform one or more practical examination tasks;
    a first computing device that receives the testing data from the testing server over the network at a network interface and executes instructions stored in memory, wherein the first computing device is coupled to the evaluation apparatus and execution of the instructions by a processor:
        grants access to the first computing device before initiating execution of a testing routine, wherein granting access to the first computing device allows the first computing device to be searched for illicit files related to the testing routine,
        implements security limitations for the first computing device during the testing routine, wherein the security limitations for the first computing device include modifying the system registry to lock out functionality on the first computing device,
        executes the testing routine for the examination using the testing data,
        observes a keystroke log for attempts to switch to another account with a different system registry,
        provides interaction data indicating manipulation by a user of the first computing device in performing one or more practical examination tasks during the testing routine, and
        automatically disables the evaluation apparatus when at least one of an illicit file related to the testing routine or an attempt to switch to another account with a different system registry is detected; and
    a second computing device coupled to the network that receives the interaction data and determines a competence of the user in the one or more practical examination tasks.

2. The system of claim 1, wherein the first computing device further executes an evaluation application concerning the one or more practical examination tasks, and the interaction data includes interaction data corresponding to user input provided by the user to manipulate the evaluation application.

3. The system of claim 2, wherein the security limitations implemented upon execution of the instructions include limitations that prohibit execution of the evaluation application during a particular portion of the testing routine.

4. The system of claim 2, wherein the security limitations implemented upon execution of the instructions include limiting functionality of the evaluation application when executed by the first computing device.

5. The system of claim 1, wherein the security limitations implemented upon execution of the instructions include prohibiting access to certain data stored in memory of the first computing device.

6. The system of claim 1, wherein the interaction data includes interaction data corresponding to the manipulation of the evaluation apparatus.

7. The system of claim 6, wherein the interaction data includes interaction data indicating a response of the evaluation apparatus to the manipulation by the user.

8. The system of claim 6, wherein further execution of the instructions implements security limitations for the evaluation apparatus.

9. The system of claim 8, wherein the security limitations for the evaluation apparatus include limitations that prohibit manipulation of the evaluation apparatus during a particular portion of the testing routine.

10. The system of claim 8, wherein the evaluation apparatus is coupled to the first computing device via the network, and wherein the security limitations for the evaluation apparatus include allowing only certain types of data to be exchanged with the evaluation apparatus via the network.

11. The system of claim 10, wherein the evaluation apparatus is physically remote from the first computing device.

12. The system of claim 6, wherein the evaluation apparatus is manipulated by the user via user input to an evaluation application executing on the first computing device, the evaluation application providing configuration data to control the evaluation apparatus based on the user input.

13. The system of claim 6, wherein the evaluation apparatus is manipulated by the user via physical input by the user to the evaluation apparatus, and the interaction data includes interaction data indicating the physical input.

14. A method for administration of a secure examination via a network, the method comprising:
    granting access to a computing device before initiating execution of a testing routine, wherein granting access to the computing device allows the computing device to be searched for illicit files related to the testing routine;
    receiving testing data for the examination during execution of the testing routine on the computing device, the testing data received over the network and including security limitations for the computing device during the testing routine, wherein the security limitations for the computing device include modifying the system registry to lock out functionality on the computing device;
    executing the testing routine for the examination using the testing data;
    observing a keystroke log for attempts to switch to another account with a different system registry;

providing interaction data over the network indicating manipulation by a user of an evaluation apparatus coupled to the computing device in performing one or more practical examination tasks during the testing routine; and automatically disabling the evaluation apparatus when at least one of an illicit file related to the testing routine or an attempt to switch to another account with a different system registry is detected.

15. The method of claim 14, wherein the interaction data includes interaction data corresponding to user input provided by the user to manipulate an evaluation application executing on the computing device.

16. The method of claim 15, wherein the security limitations include limitations that prohibit execution of the evaluation application during a particular portion of the testing routine.

17. The method of claim 15, wherein the security limitations include limiting functionality of the evaluation application when executed by the computing device.

18. The method of claim 14, wherein the security limitations include prohibiting access to certain data stored in memory of the computing device.

19. The method of claim 14, wherein the interaction data includes interaction data indicating a response of the evaluation apparatus to the manipulation by the user.

20. The method of claim 14, wherein the testing data further includes security limitations for the evaluation apparatus.

21. The method of claim 14, wherein the security limitations for the evaluation apparatus include limitations that prohibit manipulation of the evaluation apparatus during a particular portion of the testing routine.

22. The method of claim 14, wherein the evaluation apparatus is coupled to the computing device via the network, and wherein the security limitations for the evaluation apparatus include allowing only certain types of data to be exchanged with the evaluation apparatus via the network.

23. The method of claim 14, wherein the evaluation apparatus is physically remote from the computing device.

24. The method of claim 14, wherein the evaluation apparatus is manipulated by the user via user input to an evaluation application executing on the computing device, the evaluation application providing configuration data to control the evaluation apparatus based on the user input.

25. The method of claim 14, wherein the evaluation apparatus is manipulated by the user via physical input by the user to the evaluation apparatus, and the interaction data includes interaction data indicating the physical input.

* * * * *